(12) United States Patent
Pulver

(10) Patent No.: US 6,741,835 B2
(45) Date of Patent: May 25, 2004

(54) SYSTEMS AND METHODS FOR COMMUNICATIONS

(76) Inventor: Fred Pulver, 70 Eatons Neck Rd., Northpoint, NY (US) 11768

( * ) Notice: Subject to any disclaimer, the term of this patent is extended or adjusted under 35 U.S.C. 154(b) by 0 days.

(21) Appl. No.: 10/042,198

(22) Filed: Jan. 11, 2002

(65) Prior Publication Data

US 2002/0094776 A1 Jul. 18, 2002

Related U.S. Application Data

(60) Provisional application No. 60/260,887, filed on Jan. 12, 2001, and provisional application No. 60/263,500, filed on Jan. 24, 2001.

(51) Int. Cl.[7] .................................................. H04Q 7/20
(52) U.S. Cl. ....................... 455/3.05; 455/554.2; 455/462
(58) Field of Search ............................ 455/3.05, 426.2, 455/465, 74.1, 554.2, 555, 560, 462, 426.1, 422

(56) References Cited

U.S. PATENT DOCUMENTS

| | | | | |
|---|---|---|---|---|
| 4,658,096 A | | 4/1987 | West, Jr. et al. ............... 379/59 |
| 5,745,851 A | * | 4/1998 | Goto ........................ 379/88.22 |
| 5,812,651 A | * | 9/1998 | Kaplan ..................... 455/426.2 |
| 5,911,123 A | * | 6/1999 | Shaffer et al. .............. 455/553 |
| 6,078,821 A | * | 6/2000 | Kaschke et al. ............. 370/328 |
| 6,212,377 B1 | * | 4/2001 | Dufour et al. .............. 455/426 |
| 6,278,697 B1 | * | 8/2001 | Brody et al. ................ 370/310 |
| 6,591,114 B1 | * | 7/2003 | Inbody ........................ 379/156 |

* cited by examiner

Primary Examiner—Vivian Chin
Assistant Examiner—Lewis G West
(74) Attorney, Agent, or Firm—Michael D. Bednarek; Shaw Pittman LLP

(57) ABSTRACT

Embodiments of the present invention relate to systems and methods for wireline-to-wireless communications. In an embodiment of the present invention, a system for wireline-to-wireless communications includes a base unit. The base unit includes a wireline interface coupled to the subscriber loop interface. The system also includes a wireless communications device adapter coupled to the base unit. The wireless communications device adapter includes a second interface, and the first interface is coupled to the second interface.

9 Claims, 12 Drawing Sheets

SYSTEMS AND METHODS FOR COMMUNICATIONS

CROSS-REFERENCE TO RELATED APPLICATION

This application claims the benefit of U.S. Provisional Patent Application Ser. No. 60/260,887, filed Jan. 12, 2001, and U.S. Provisional Patent Application Ser. No. 60/263,500, filed Jan. 24, 2001, both of which are herein incorporated by reference in their entirety.

BACKGROUND OF THE INVENTION

1. Field of the Invention

Embodiments of the present invention relate to communications systems and methods. More particularly, embodiments of the present invention relate to systems and methods for wireline-to-wireless communications.

2. Background Information

Known systems provide for interfacing a standard telephone set with a wireless communications device (e.g., a celular telephone, etc.). For example, U.S. Pat. No. 4,658,096, issued Apr. 14, 1987, describes an interface system for interfacing a standard telephone set with a wireless communications device. The interface system converts tone-dial or pulse-dial inputs from the telephone into a serial data stream for storage in the transceiver. The interface system automatically determines when the last numeral or digit is dialed and provides a send signal to the transceiver when such determination is made. The system responds to incoming call signals, such as alert signals, from the transceiver and rings the telephone. The system simulates ring and dial-tone signals under conditions typical of standard telephone set usage.

In 1987, when U.S. Pat. No. 4,658,096 issued, wireless communications devices were not in widespread usage as compared to today. Moreover, wireless communications device users often change wireless communications devices to take advantage of features of newer wireless communications devices such as smaller size, improved battery life, new communications features, and so on. In view of the foregoing, it can be appreciated that a substantial need exists for systems and methods that can advantageously provide for wireline-to-wireless communications.

BRIEF SUMMARY OF THE INVENTION

Embodiments of the present invention relate to systems and methods for wireline-to-wireless communications. In an embodiment of the present invention, a system for wireline-to-wireless communications includes a base unit. The base unit includes a wireline interface and a first interface coupled to the subscriber loop interface. The system also includes a wireless communications device adapter coupled to the base unit. The wireless communications device adapter includes a second interface, and the first interface is coupled to the second interface.

Figure 1:
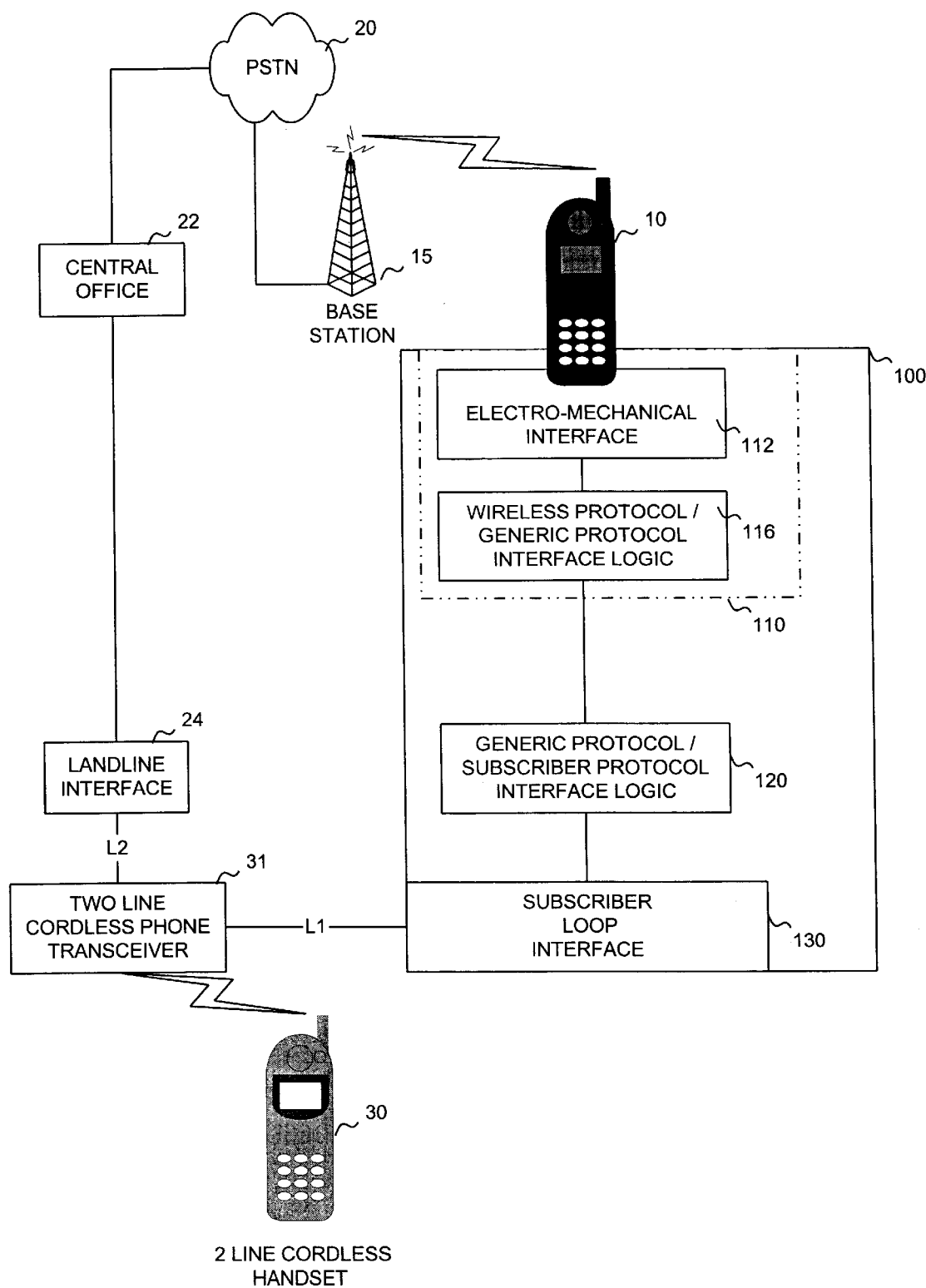
FIG. 1 shows an illustration of an embodiment of the present invention.

Before one or more embodiments of the invention are described in detail, one skilled in the art will appreciate that the invention is not limited in its application to the details of construction, the arrangements of components, and the arrangement of steps set forth in the following detailed description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

FIG. 1 shows an illustration of an embodiment of the present invention. Embodiments of the present invention relate to a communications system 100 ("system 100"), a commercial embodiment of which is called a CellSocket™, which includes a physical and electrical socket (e.g., an electromechanical socket) that can receive a wireless communications device 10 ("WCD 10") (e.g., a cellphone, a wireless handset, etc.) so that the system 100 and WCD 10 are electrically coupled. For example, WCD 10 can include (e.g., along the bottom of WCD 10, along one or more edges of WCD 10, along one or more surface areas of WCD 10, etc.) an electrical interface that can include a connection to an antenna of WCD 10.

As used to describe embodiments of the present invention, the term "coupled" encompasses a direct connection, an indirect connection, or a combination thereof. Two devices that are coupled can engage in direct communications, in indirect communications, or a combination thereof. Moreover, two devices that are coupled need not be in continuous communication, but can be in communication typically, periodically, intermittently, sporadically, occasionally, and so on.

In an embodiment, WCD 10 is coupled to wireless communications device interface 110 ("WCDI 110"), which can include an electromechanical interface 112 and wireless protocol/generic protocol interface logic 116 ("WP/GPI logic 116"). The electromechanical interface 112 can include contacts that interface with electrical contacts of WCD 10, so that communications signals can be transmitted between WCD 10 and WCDI 110. System 100 can also include an antenna (e.g., an integral antenna, an external antenna) that can be coupled to WCD 10 via the electro-mechanical interface of WCDI 110 so that the WCD 10 can better receive and transmit signals. In another embodiment, system 100 can include an antenna that can be coupled to WCD 10 via a dedicated antenna interface distinct from the electromechanical interface of WCDI 110.

WCDI 110 can be a modular unit that can be coupled and decoupled from system 100. For example, a WCDI 110 can be specific to a particular wireless phone model. A Nokia 5160 can be coupled to a first WCDI 110, a Motorola Startac can be coupled to a second WCDI 110, and so forth. Thus, a WCDI 110 can be coupled to, or include, a physical socket that receives the Motorola Startac, and another WCDI 110 can be coupled to, or include, a physical socket that receives another WCD 10. When a user receives a new WCD 10 as a replacement for an old WCD 10 (e.g., replaces a broken WCD, upgrades to a different WCD), the user can (i) receive a new WCDI 110 that can be coupled to the new WCD 10; (ii) remove from system 100 the old WCDI 110 that coupled to the old WCD 10; and (iii) attach (e.g., install, connect, etc.) the new WCDI 110 to the system 100. Thus, WCDI 10 can be a modular adapter that couples a WCD 10 to a base portion of system 100.

WCDI 110 can be coupled to generic protocol/subscriber protocol interface logic 120 ("GP/SPI logic 120"), which can send communications signals from the WCDI 110 to the subscriber loop interface 130 ("SLI 130") and send communications signals from the SLI 130 to the WCDI 110. The SLI 130 can be coupled to a telephone handset (e.g., to a cordless handset via a cordless transceiver, a landline telephone handset, a two-line telephone handset, etc.). For example, as illustrated in FIG. 1, SLI 130 is coupled to a two-line cordless handset 30 via two-line cordless phone transceiver 31. SLI 130 is an example of a wireline interface. An example of another wireline interface is a private branch exchange interface.

Thus, in accordance with an embodiment of the present invention, two-line cordless handset 30 can use a first line (e.g., Line 1) of the two-line cordless handset 30 to receive an incoming call to the WCD 10 from the public switched telephone network 20 (PSTN 20) via wireless base station 15. The incoming call can be received by the WCD 10 and communicated to cordless handset 30 via system 100 and cordless phone transceiver 31. Likewise, an outgoing call can be placed from cordless handset 30 over the wireless communications link between the WCD 10 and wireless base station 15 via cordless phone transceiver 31 and system 100.

The two-line cordless handset 30 can also make and receive calls via a landline communications link using the other line of the two-line cordless handset 30. For example, in an embodiment, when a user can make and receive calls with two-line cordless handset 30 via WCD 10 by using the first line (LI) of the two-line cordless handset 30 and two-line cordless phone transceiver 31, the user can make and receive calls with two-line cordless handset 30 via landline interface 24 and central office 22 by using the second line (L2) of the two-line cordless handset 30 and two-line cordless phone transceiver 31.

System 100, in an embodiment, is a versatile system that can accommodate different wireless communication devices due to the modular nature of the WCDI 110. The WCDI 110 can transmit/receive signals to/from the GP/SLI logic 120 via a generic protocol (e.g., using a generic interface) and transmit/receive signals to/from the WCD 10 via the WP/GPI logic 116 and electromechanical interface 112.

Figure 6:
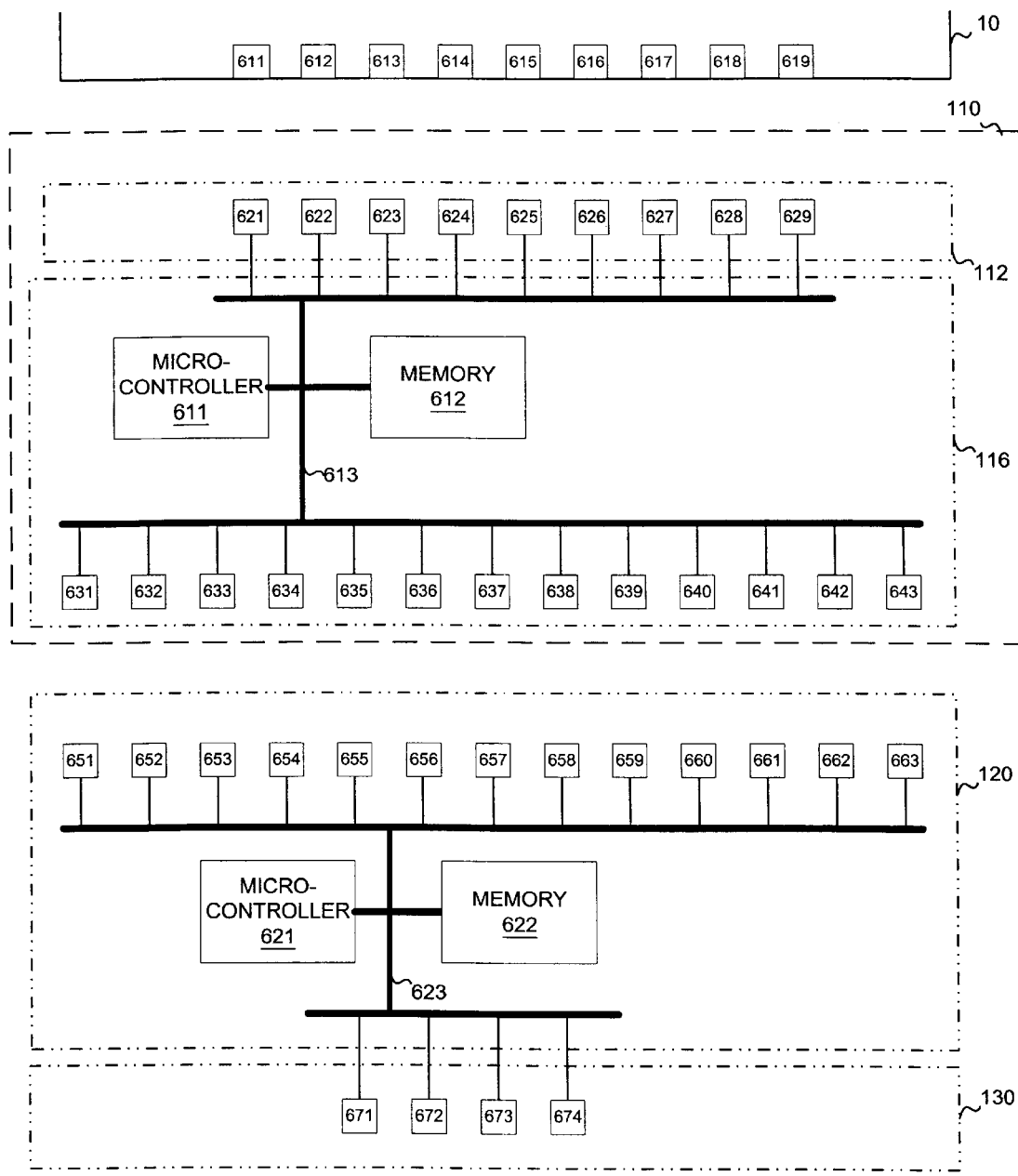
FIG. 6 shows a more detailed illustration of an embodiment of a wireless communications device interface in accordance with an embodiment of the present invention.

FIG. 6 shows a more detailed illustration of an embodiment of a WCDI 110. A WCD 10 can include a plurality of device-interface electrical connectors 611–619. Examples of device-interface electrical connectors 611–619 include pins, contacts, and so on. Device-interface electrical connectors 611–619 ("DECs 611–619") can be coupled to other electrical connectors to receive and/or send (i) current (e.g., for charging a battery, for discharging a battery, etc.) and/or (ii) communications signals (e.g., audio communications signals, data communications signals, etc.). In an embodiment, DEC 611 can be a charge current connector that receives an electric current for charging a battery of WCD 10, DEC 612 can be a charge current control connector (e.g., a pulse width modulation ("PWM") control signal connector) to receive a charge current control signal, and DEC 619 can be a power ground connector (e.g., for battery charging). DEC 613 can be an audio-in connector that receives an audio signal that is to be transmitted by the WCD 10 (e.g., transmitted to a wireless base station 15 illustrated in FIG. 1), DEC 614 can be an audio-out connector that outputs an audio signal received by WCD 10 (e.g., received from wireless base station 15 illustrated in FIG. 1), and DEC 615 can be a signal ground connector (e.g., a ground connector with respect to the audio-in and audio-out signals). DECs 616–618 can be data bus connections for data communications.

WCD 10 and DECs 611–619 can be coupled to WCDI 110 via electro-mechanical interface 112. In an embodiment, electromechanical interface 112 can include a plurality of device-interface electrical connectors 621–629 (DECs 621–629), and each of DECs 611–619 can be electrically coupled to DECs 621–629 (i.e., DEC 611 is electrically coupled to DEC 621, DEC 612 is electrically coupled to DEC 622, and so forth) so that power and communications signals (e.g., audio signals, data signals, etc.) can be transferred between WCD 10 and WCDI 110. In another embodiment, each of WCD 10 and WCDI 110 include an IR port for transmitting and receiving communications signals (e.g., audio signals, data signals, etc.).

According to an embodiment of the present invention, WCDI 110 can include WP/GPI logic 116, where WP/GPI logic 116 includes microcontroller 611, memory 612, bus 613, and a plurality of generic-interface electrical connectors 631–643 ("GECs 631–643"). Microcontroller 611 can be an Atmel AT89-S8252-24AC microcontroller manufactured by Atmel Corporation of San Jose, Calif. In another embodiment, microcontroller 611 can be an ASIC (Application Specific Integrated Circuit). Microcontroller 611 can execute instructions adapted to be executed that are stored in memory 612. Memory 612 may be a random access memory (RAM), a dynamic RAM (DRAM), a static RAM (SRAM), a volatile memory, a non-volatile memory, a flash RAM, a cache memory, a hard disk drive, a magnetic storage device, an optical storage device, a magneto-optical storage device, or a combination thereof. The terms "instructions configured to be executed" and "instructions to be executed" are meant to encompass any instructions that are ready to be executed in their present form (e.g., machine code) by a processor, or require further manipulation (e.g., compilation, decryption, or provided with an access code, etc.) to be ready to be executed by a processor.

Microcontroller 611 can control the transfer of power and communications signals between the plurality of DECs 621–629 and the plurality of GECs 631–643 via bus 613. In an embodiment, bus 613 includes a plurality of buses (e.g., a power bus, a communications bus, a control bus, etc.). The plurality of GECs 631–643 can provide a generic interface (e.g., power interface, communications interface, etc.) so that WCDI 110 can be a modular component that can be swapped in and out of system 100. In an embodiment, the plurality of GECs 631–643 can include a first VREF GEC 631, a second VREF GEC 632, and a third VREF GEC 633, where each of the first VREF, the second VREF, the third VREF can be a reference voltage that can provide power to WCDI 110 (e.g., to microcontroller 611, memory 612, and associated circuitry) and/or to WCD 10. For example, in an embodiment, a reference voltage can be 12 volts, 5 volts, 3.3 volts, 2.2 volts, 1.1 volts, 0.8 volts, and so on. GEC 634 can be a voltage ground connector. GEC 635 can be an audio-in connector that receives an audio signal that is to be transmitted by the WCD 10 (e.g., transmitted to wireless base station 15 illustrated in FIG. 1), GEC 636 can be an audio-out connector that carries an audio signal received by WCD 10 (e.g., received from wireless base station 15 illustrated in FIG. 1), and GEC 637 can be a signal ground connector (e.g., a ground connector with respect to the audio-in and audio-out signals).

GECs 638–643 can be generic-interface data bus connections to carry data communications. In an embodiment, GEC 638 can be a transmit data connector that carries data to be transmitted by WCD 10 (e.g., transmitted to wireless base station 15 illustrated in FIG. 1), and GEC 639 can be a receive data connector that carries data received by WCD 10 (e.g., received from wireless base station 15 illustrated in FIG. 1). The generic-interface data bus connections can also include a first data control GEC 640, a second data control GEC 641, a reset line GEC 642, and a signal clock GEC 643 to control and enable data communications (e.g., via TXDATA GEC 638 and RXDATA GEC 639).

WCDI 110 and GECs 631–643 can be coupled to GP/SPI logic 120 via a plurality of generic-interface electrical connectors 651–663 (GECs 651–663), where each of GECs 631–643 can be electrically coupled to GECs 651–663 (i.e., GEC 631 is electrically coupled to GEC 651, GEC 632 is electrically coupled to GEC 652, and so forth) so that power and communications signals (e.g., reference voltages, audio signals, data signals, control signals, and so on) can be transferred between WCDI 110 and GP/SPI logic 120.

According to an embodiment of the present invention, GP/SPI logic 120 includes microcontroller 621, memory 622, and bus 623. GP/SPI logic 120 can be coupled to a subscriber loop interface 130 (SLI 130), and the SLI 130 can include four subscriber-interface electrical connectors 671–674 (SECs 671–674). Microcontroller 621 can be an Atmel AT89-S8252-24AC microcontroller, and memory 622 can store instructions adapted to be executed by microcontroller 621. In an embodiment, SLI 130 can include four SECs 671–674 that can be coupled to an RJ-11 jack. Microcontroller 621 can process and control communication signals so that the communication signals can be transmitted between SLI 130 and WCD 10 via WCDI 110.

In an embodiment, GP/SPI logic 120 can include additional GECs that can be reserved for future connections as yet undefined. For example, in an embodiment, GP/SPI logic 120 includes four additional GECs (e.g., GECs 664–667) that have no present defined functionality, but each of the four additional GECs can be coupled to microcontroller 621. Thus, when wireless communications devices are marketed that include additional functionality (e.g., additional communications services), a WCDI 110 having additional GECs and/or DECs can be coupled to the GP/SPI logic 120 of system 100.

Referring again to FIG. 1, according to an embodiment of the present invention, WCD 10 can receive an incoming wireless call alert, which can include caller identification ("caller ID") information. The incoming wireless call alert can cause the WCD 10 to activate an audible call alert signal (e.g., start ringing) and display caller ID information (e.g., the number of calling party). WCD 10 can also transmit a wireless call alert signal and the caller ID information to system 100 (e.g., via one or more data connections of DECs 611–619 illustrated in FIG. 6). System 100 can recognize the wireless call alert signal and generate an incoming call signal including the caller ID information to be sent to two-line cordless phone transceiver 31. When the two-line cordless phone transceiver 31 receives the incoming call signal, the two-line cordless handset 30 can be instructed by the two-line cordless phone transceiver 31 to sound an audible alert and display the caller ID information.

The embodiments described herein are illustrative of embodiments of the present invention. For example, as is apparent to one skilled in the art, the number and functions of the DECs and GECs can vary based at least in part on, for example, the different designs of WCDs and the signals (e.g., power, communications, control, data, etc.) communicated by system 100.

In an embodiment, system 100 includes circuitry that can receive DTMF tone signals from cordless phone transceiver 31 and convert the DTMF tone signals to data signals to dial an outgoing call via the WCD 10. Because a typical cordless handset 30 does not include a "SEND" button that is usually provided on a WCD (e.g., a cellular phone), system 100 includes circuitry that recognizes a particular DTMF tone signal (e.g., the DTMF tone signal corresponding to the # or * key) or a sequence of DTMF tone signals (e.g., a # DTMF tone signal followed by a * signal) as a SEND command. For example, microcontroller 621 of GP/SLI logic 120 can receive the DTMF tone signals via SLI 130, recognize the DTMF tone signals as corresponding to digits 0–9, and generate corresponding data signals to be transmitted to the WCD 10 via WCDI 110.

In an embodiment, after a user has dialed a certain number of digits (e.g., 10 digits, 7 digits, 11 digits, etc.) of a call that is to be made via WCD 10, GP/SLI logic 120 of system 100 can prompt the user to generate a send command by pressing a certain key (e.g., the # or * key on the keypad of the telephone handset). For example, after a user has dialed at least 10 digits (or 7 digits, or 11 digits, etc.) on the cordless handset 30, but has not dialed the SEND command (e.g., the # and/or * key), system 100 can send a message prompting the user to dial the SEND commend if the user wishes to initiate the call. The message can be an audio message (e.g., "Press the # key to begin the call"), an audio tone, a text message (e.g., displayed upon a screen of cordless handset 30), a combination thereof, and so on. In a further embodiment of the present invention, system 100 can automatically determine when the SEND command is to be sent. For example, system 100 can recognize dialed digit sequences (e.g., 411, 911, etc.), analyze dialed digit sequences (e.g., recognize area codes and count dialed digits), analyze the timing of dialed digits (e.g., generate the SEND command if a digit not dialed after a 2 second time-out period), and so on.

In an embodiment, system 100 can be coupled to a two-line cordless phone transceiver 31 and a two line cordless handset 30 where the user can initiate (i) wireless calls over a first line L1 that couples the two-line cordless phone transceiver 31 to the system 100 and (ii) landline calls (e.g., via a central office 22 coupled to the PSTN 20) over a second line L2 coupled to the two-line cordless phone transceiver 31 and two-line cordless handset 30. In an embodiment, the first line LI can include an RJ-11 plug at each end, and system 100 can include an RJ-11 socket coupled to the subscriber loop interface.

Thus, in an embodiment, the system 100 works with many wireless communications devices and includes an electrical interface particular to the wireless communication device. A user that wishes to make a call can dial a phone number on a telephone handset coupled to the system 100 via the SLI 130, and the system 100 can send a series of commands to the WCD 10 via the WP/GPI logic 116 to initiate the call. The WP/GPI logic 116 can receive generic commands from the GP/SPI logic 120 (e.g., receive communications signals via the generic-interface electrical connectors of the GP/SPI logic 120) and convert the generic commands to those specific to the WCD 10 coupled to the WP/GPI logic 116 (e.g., convert the received communications signals to communications signals particular to the WCD 10). In an embodiment, system 100 includes a set of generic commands for initiating outgoing calls, receiving outgoing calls, terminating calls, and so on.

Figure 2:
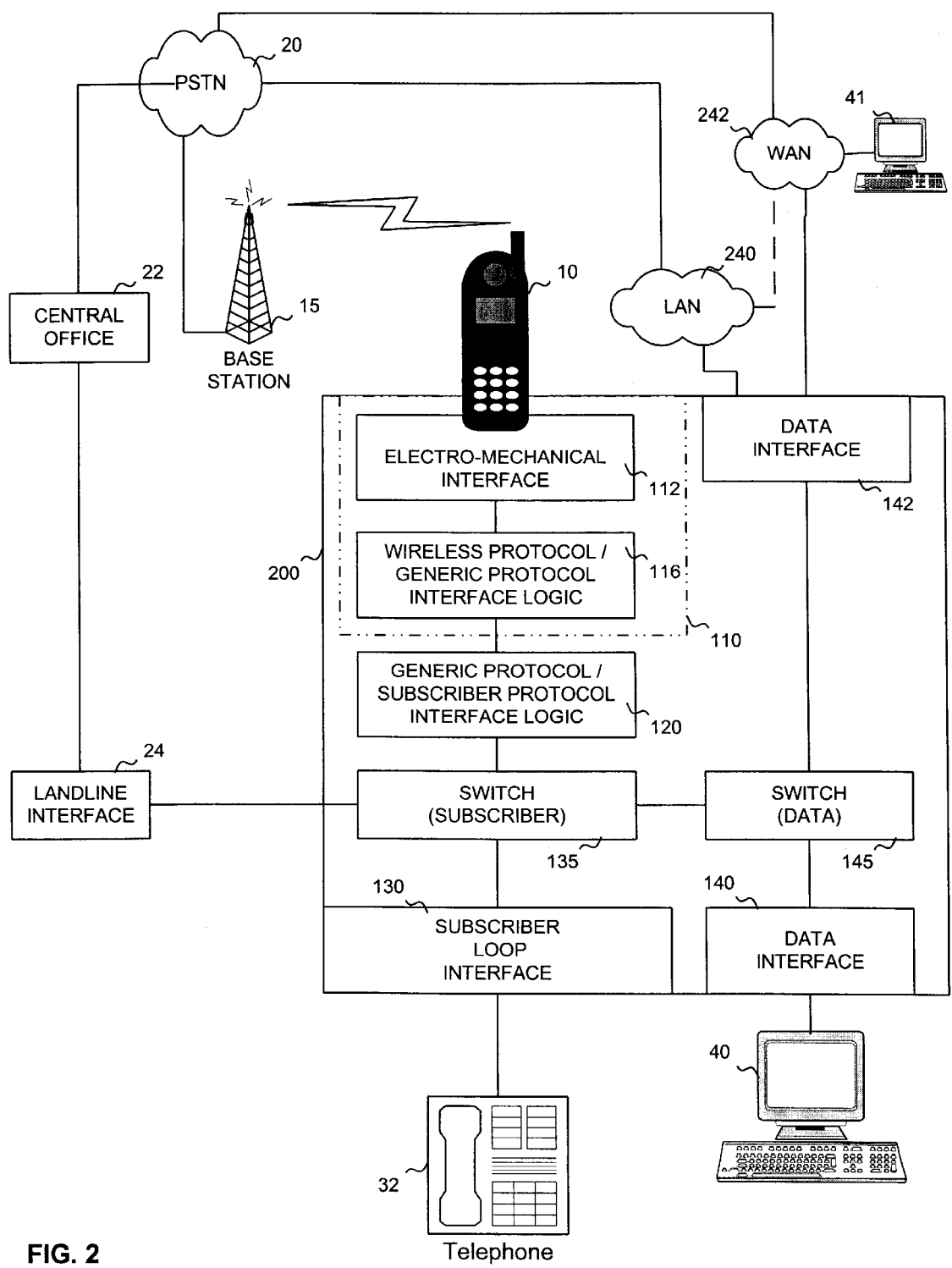
FIG. 2 shows another embodiment of the present invention.

FIG. 2 shows another embodiment of the present invention. A system 200 can include a first data interface 140 that can be coupled to a computer 40. For example, first data interface 140 can be a USB or a RS232 connection. In another embodiment, the first data interface 140 can be an RJ-11 or an RJ-45 (e.g., Ethernet) connection. System 200 can also include a second data interface 142 that can be coupled to a local area network ("LAN") 240 or a wide area network ("WAN") 242. In an embodiment, the second data interface 142 can be an Ethernet interface over which data and voice data (e.g., VoIP data) can be communicated.

In an embodiment, system 200 can be configured to place calls from a telephone 32 over a landline link (e.g., via landline interface 24 and central office 22) or over a wireless link (e.g., via WCD 10 and wireless base station 15). For example, in an embodiment, system 200 can have a configurable default status that calls are initiated over one link of the landline link and the wireless link, but the user may select to initiate calls over the other link by communicating a command to system 100. For example, a user can depress a sequence of keys on telephone 32 to select a particular link for a call. In an embodiment, a user can key *9 to select the wireless link (e.g., because the digit 9 corresponds to the letter W (for wireless) on a phone keypad) and key *5 to select the landline link (e.g., because the digit 5 corresponds to the letter L (for landline) on a phone keypad).

When a user picks up telephone 32 coupled to system 200 to initiate a call, and system 200 is configured to place that call via WCD 10 and the wireless base station 15 (e.g., a cellular phone base station), system 200 can generate a tone that the user will hear that indicates that the call will be initiated over a wireless link between WCD 10 and the wireless base station 15. Thus, system 200 generates a different type of signal than the typical landline dial tone so that a user knows the call will be made via the WCD 10 and not over the landline. In an embodiment, system 200 can include a switch 135 coupled to the SLI 130 of system 200 so that calls can be initiated over the landline to the central office 22 or over a wireless link between WCD 10 and the wireless base station 15. The switch 135 can respond to DTMF tone signal commands (e.g., # indicates place a wireless call, and * indicates place a landline call) or be coupled to logic (e.g., a microprocessor and memory) that can perform least-cost call routing (e.g., place long distance calls on weekends via WCD 10 due to a free long-distance on weekends wireless plan).

In an embodiment, system 200 can allow a user to utilize the "direct connect" or "talk around" feature of certain wireless communications devices (e.g., Nextel phones). Such phones can include a "push to talk" button that, when pressed by the user, allow the user to speak to another user. The "push to talk" button is then released by the user so that the user can hear what the other user says. For example, telephone 32 (e.g., a cordless handset, a corded telephone) can be coupled to system 200 via the SLI 130, where the telephone 32 does not include a specialized "push to talk" button. System 200, however, can provide the "push to talk" feature for telephone 32 by recognizing a series of keystrokes, or a depressed key, as a pseudo-"press to talk" button. In an embodiment, a user can press a key once on telephone 32 (e.g., the # key) to initiate the talk portion of a "push to talk" communication. The user can press the key twice to end the talk portion of the "push to talk" communication and begin a listen portion of the "push to talk" communication. System 200 can interpret the DTMF tone signals generated by the user pressing the key, and send WCD 10 the appropriate commands to implement the "push to talk" communication. In another embodiment, the user can push and hold a handset key (e.g., the # key) as a pseudo-"push to talk" button, and the system 200 generates an anti-tone that cancels out the DTMF tone generated by holding the handset key so that the user can talk and hear what he or she is saying during the talk portion of a "push to talk" communication. When the user releases the handset key, the talk portion of the "push to talk" communication is ended and the listen portion of the "push to talk" communication is begun. In another embodiment, a first key can be pressed (e.g.,. the # key) to indicate the beginning of a talk portion of a "push to talk" communication, and a second key can be pressed (e.g., the * key) to indicate the end of the talk portion of a "push to talk" communication. In an embodiment, system 200 can automatically terminate a talk portion of a "push to talk" communication when the talk portion is initiated but no user speech is detected over a period of time. Thus, system 200 can address situations in which a talk portion of a "push to talk" communication is initiated by an errant keystroke or a user neglects to appropriately end the talk portion of a "push to talk" communication (e.g., forgets to enter the appropriate terminating key sequence, does not depress the appropriate terminating key, etc.). Thus, system 200 allows a user to engage in "push to talk" communications even though a telephone 32 does not include a specialized (e.g., dedicated) "push to talk" button.

In an embodiment as illustrated in FIG. 2, system 200 can be coupled to computer 40 and include a switch 145 to direct data communications with computer 40 over: (i) the LAN 240 and/or WAN 242 via data interface 142: (ii) the wireless link between wireless base station 15 and WCD 10 via WCDI 110; or (iii) the landline link via landline interface 24 and central office 22. An example of a landline interface 24 includes an RJ-11 jack coupled to the landline to the central office 22.

In an embodiment of the present invention, system 200 has an Internet Protocol ("IP") address that allows data communications to be sent from a network (e.g., from WAN 242, from LAN 240, from the Internet, and so on) to the system 200 to provide for: (i) configuring of system 200; (ii) setting up call optimization; (iii) screening calls; (iv) reading, editing and updating of interface parameters (e.g., the WP/GPI logic 116, the GP/SPI logic 120, and so on); (v) configuring an address book stored on WCD 10. For example, in an embodiment, computer 41 can be a server that communicates with system 200 to update the interface parameters of system 200 and/or otherwise configure system 200. In another embodiment, system 200 can be coupled to computer 41 (e.g., a server) and receive call optimization data such as least-cost call routing data. For example, system 200 can receive from computer 41 information such as the number of free wireless minutes (e.g., home-area minutes, long-distance minutes, weekend minutes, evening minutes, etc.) remaining in a monthly plan for WCD 10, and make a decision as to whether to initiate a call based on that information. System 200 can also be coupled to computer 40 and/or computer 41 to receive call screening profile information (e.g., information regarding which incoming calls are to be screened, information related to call screening actions for particular calling numbers, and so on.). As another example, computer 41 can communicate with WCD 10 via system 200 to update software and/or firmware of WCD 10. In an embodiment, WCD 10 includes a microbrowser (e.g., a Wireless Application Protocol (WAP) browser) to access wireless data services, and system 200 can receive microbrowser and/or wireless data services access software updates for WCD 10 from computer 41 via WAN 242. WCD 10 can include an on-board address book that stores phone numbers and other contact information, and the on-board address book can be updated by receiving data from computer 40 and/or computer 41 via system 200.

Computer 40 and/or computer 41 can include a processor coupled via a bus to a network port and a memory. The processor can be, for example, an Intel Pentium® 4 processor, manufactured by Intel Corp. of Santa Clara, Calif. As another example, the processor can be an Application Specific Integrated Circuit (ASIC). An example of the bus is a peripheral component interconnect ("PCI") local bus, which is a high performance bus for interconnecting chips (e.g., motherboard chips, mainboard chips, etc.), expansion boards, processor/memory subsystems, and so on.

The network port can be an Ethernet port, a serial port, a parallel port, a Universal Serial Bus ("USB") port, an Institute of Electrical and Electronics Engineers, Inc. ("IEEE") 1394 port, a Small Computer Systems Interface ("SCSI") port, a Personal Computer Memory Card International Association ("PCMCIA") port, and so on. The memory of computer 40 and/or computer 41 can store a plurality of instructions configured to be executed by the processor. The memory may be a random access memory (RAM), a dynamic RAM (DRAM), a static RAM (SRAM), a volatile memory, a non-volatile memory, a flash RAM, polymer ferroelectric RAM, Ovonics Unified Memory, magnetic RAM, a cache memory, a hard disk drive, a magnetic storage device, an optical storage device, a magneto-optical storage device, or a combination thereof.

Computer 40, in an embodiment, is a server coupled to WAN 242. The server can be, for example, a Windows NT server from Hewlett-Packard Company of Palo Alto, Calif., a UNIX server from Sun Microsystems, Inc. of Palo Alto, Calif., and so on. Examples of WAN 242 include the Internet, a wireless network, a wired network, a connection-oriented network, a packet network, an Internet Protocol (IP) network, or a combination thereof.

According to an embodiment of the present invention, the memory of computer 40 can include web graphical user interface ("GUI") instructions. In an embodiment, the web GUI instructions can be client-side web GUI instructions (e.g., a web browser) that can manage at least in part communications between computer 40 and a server (e.g., a world wide web server, etc.). Examples of client-side web graphical user interface instructions include Internet Explorer 5.0 (or another version) from Microsoft Corporation of Redmond, Wash., Netscape Navigator 4.72 (or another version) from Netscape Communications of Mountain View, Calif., and so on.

Figure 3:
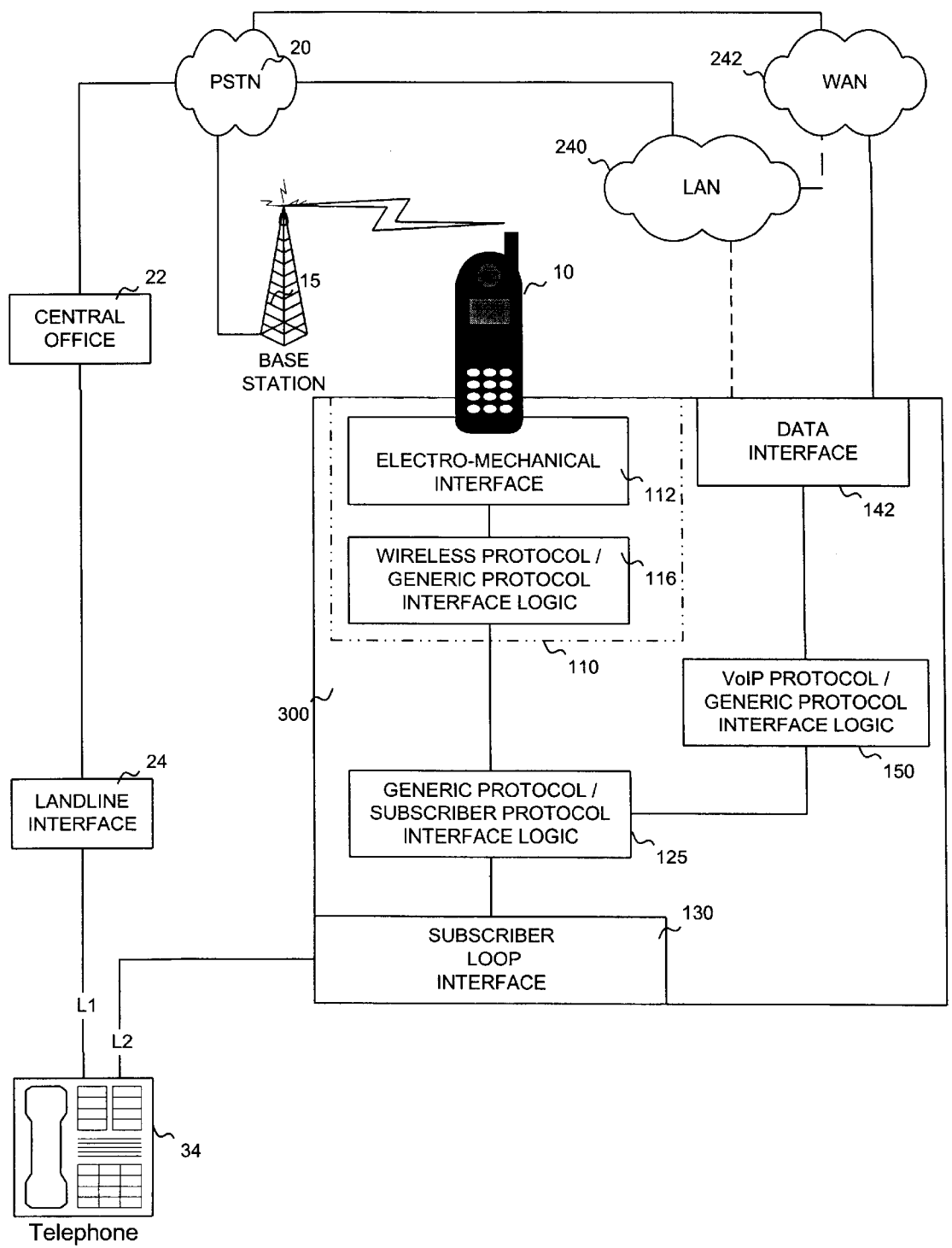
FIG. 3 shows another system in accordance with an embodiment of the present invention.

FIG. 3 shows another system in accordance with an embodiment of the present invention. System 300 can include VoIP protocol/generic protocol interface ("VoIP/GPI") logic 150 that allows telephone 34 coupled to system 300 via the SLI 130 to engage in VoIP communications over a data network (e.g., LAN 240, a WAN 242). In one embodiment, the VoIP/GPI logic 150 of system 300 is coupled to telephone 34 via the GP/SCI logic 125. In another embodiment, the VoIP/GPI logic is coupled to the SLI 130 but not coupled to the GP/SPI logic 125. In an embodiment, data interface 142 can be an Ethernet interface that can be coupled to LAN 240, WAN 242, and so on. In another embodiment, data interface 142 is coupled to a computer that is coupled to LAN 240, WAN 242, and so forth.

Figure 4:
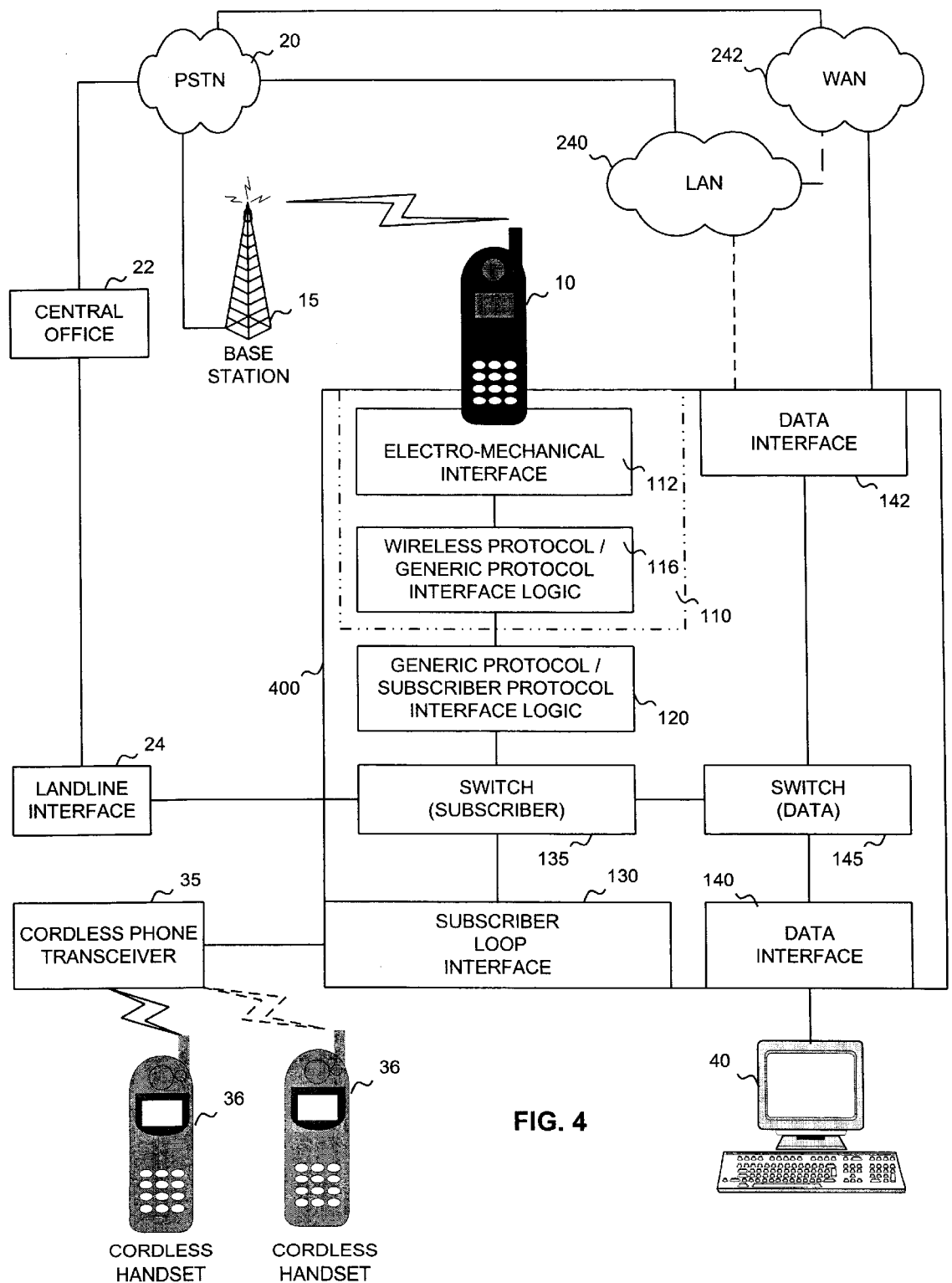
FIG. 4 is a schematic diagram of another embodiment of the present invention.

FIG. 4 is a schematic diagram of another embodiment of the present invention. A cordless phone transceiver 35 can be coupled to subscriber loop interface 130 of system 400, where the cordless phone transceiver 35 can communicate with a plurality of cordless handsets 36. In an embodiment, system 400 is coupled to cordless phone transceiver 35 via an RJ-11 cable. In another embodiment, system 400 includes an integrated cordless phone transceiver.

Cordless phone transceiver 35 can communicate with the plurality of cordless phone handsets 36 over a cordless phone frequency band such as the 46–49 MHz band, the 900 MHz band (i.e., 905–928 MHz), the 2.4 GHz band, and so on. WCD 10 can communicate with wireless base station 15 via a wireless communications protocol, and wireless base station 15 can include and/or be coupled to a mobile switching center of a wireless communications network (e.g., a cellular telephone network). Examples of a wireless communications protocol include a cellular phone communications protocol, an analog Advanced Mobile Phone Service ("AMPS") protocol, a Global System for Mobile Communications ("GSM") protocol, an IS-95 digital code division multiple-access ("CDMA") cellular radio system protocol, an IS-136 digital AMPS cellular radio system protocol, a time division multiple access ("TDMA") cellular system protocol, a Personal Communications Services ("PCS") protocol, and so forth.

According to an embodiment of the present invention, when a user couples a new WCDI 110 to system 400, the new WCDI 110 can query the base unit portion of system 400 (e.g., a base unit portion including the GP/SPI logic 120) to determine the version of software stored on and/or executed by the base unit portion of system 400. When the software stored on and/or executed by the base unit portion of system 400 is older than a newer version stored on the new WCDI 110, the newer version can be installed on the base unit portion of system 400 from the new WCDI 110. Thus, according to an embodiment of the present invention, the base unit portion of the system (e.g., system 400) is programmable and updateable.

According to an embodiment of the present invention, system 400 is coupled to a Private Branch Exchange ("PBX") via SLI 130. The PBX is coupled to one or more telephones. A call received by WCD 10 can be communicated to the PBX via system 400, and the PBX can direct the call to a telephone coupled to the PBX. A telephone coupled to the PBX can initiate a call, and the PBX can direct the call to system 400 so that the call can be carried by a wireless communications link between WCD 10 and wireless base station 15.

Figure 5:
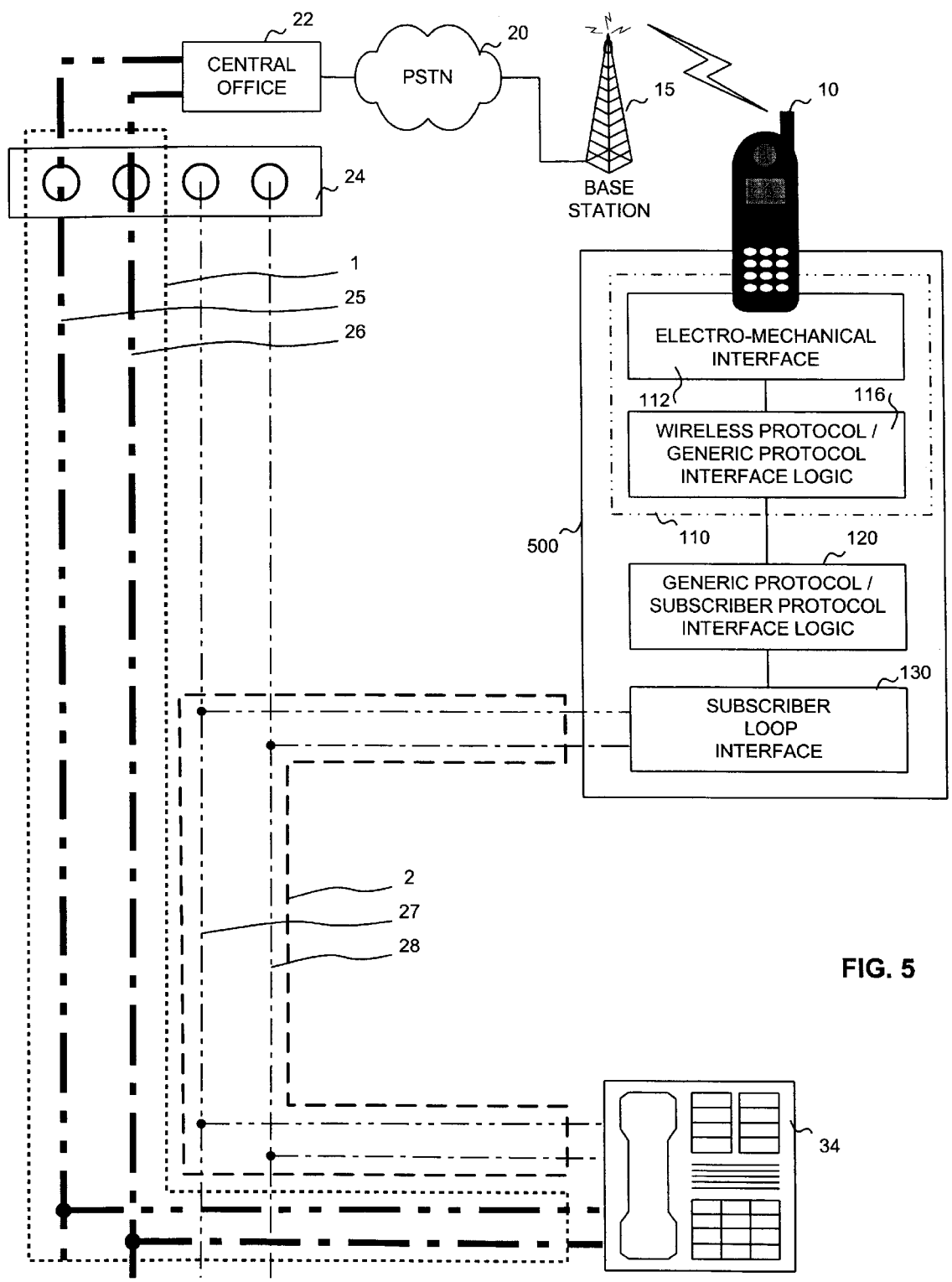
FIG. 5 illustrates another embodiment of the present invention.

FIG. 5 illustrates another embodiment of the present invention. A two-line telephone 34 can be coupled to system 500 via the internal wiring of a residence. The internal wiring can include two lines: (i) a first line 1, which includes wires 25 and 26, that is actively connected to a central office 22, and (ii) a second line 2, which includes wires 27 and 28, that is not actively connected to the central office 22. The first line of the two-line telephone 34 can be used to engage in landline communications via the first line 1 and the central office. The other line of the two-line telephone 34 can be used to couple the two-line telephone 34 to system 500 via the second line 2 so that the two-line telephone 34 can initiate, receive, and conduct at least in part wireless communications via system 500, WCD 10, and wireless base station 15 (e.g., a cellular base station). In accordance with such an embodiment of the present invention, a plurality of two-line telephones 34 can be coupled to system 500 via the internal wiring of a residence, and each of the two-line telephones 34 can be used to initiate, receive and conduct at least in part wireless communications via system 500, WCD 10, and base station 15.

Figure 7:
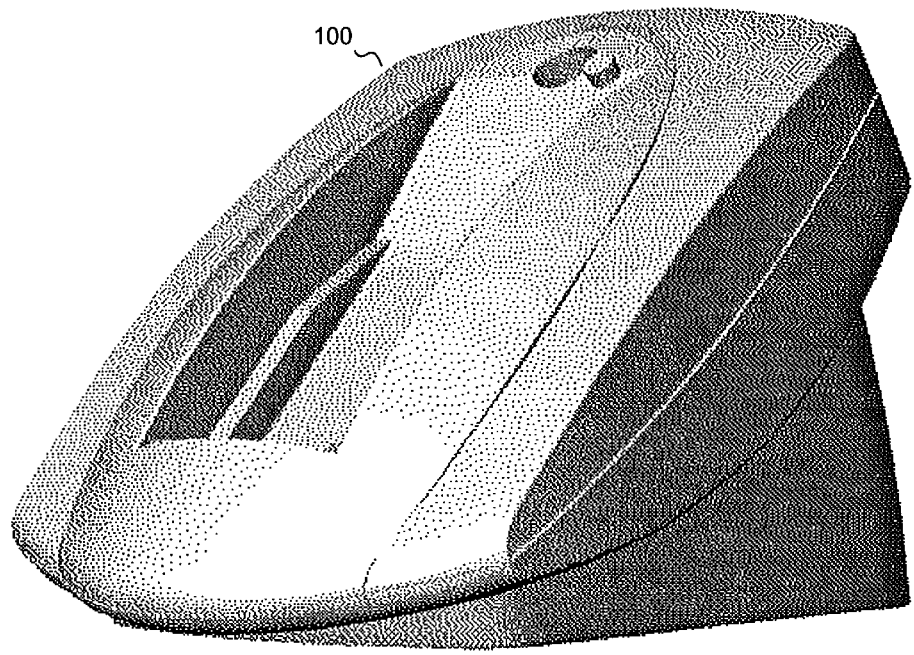
FIG. 7 illustrates an embodiment of the present invention.
Figure 8:
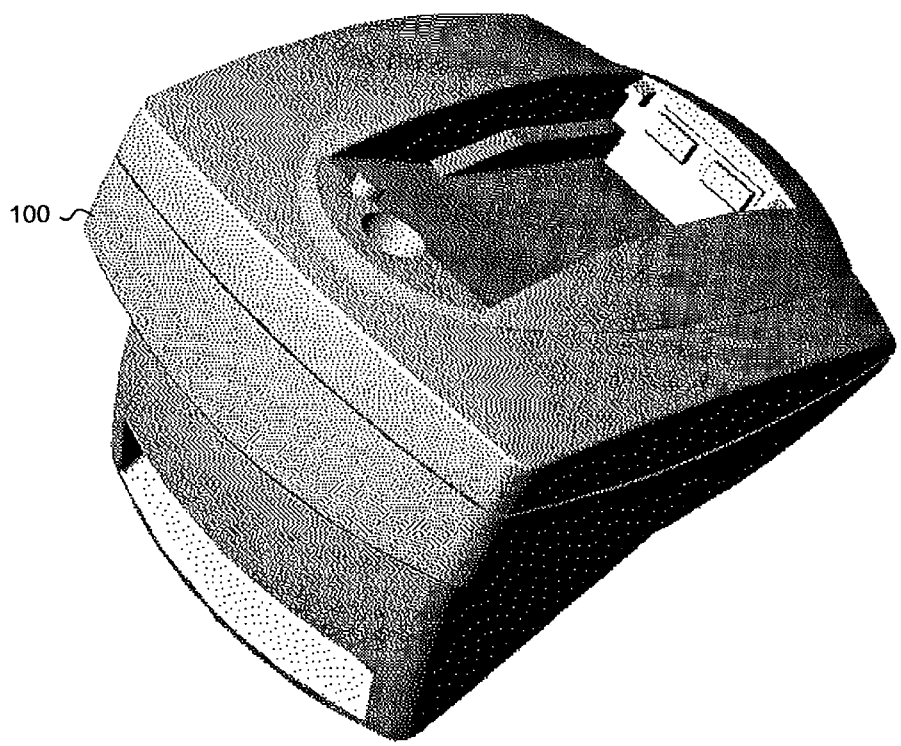
FIG. 8 shows another illustration of the embodiment illustrated in FIG. 7.
Figure 9:
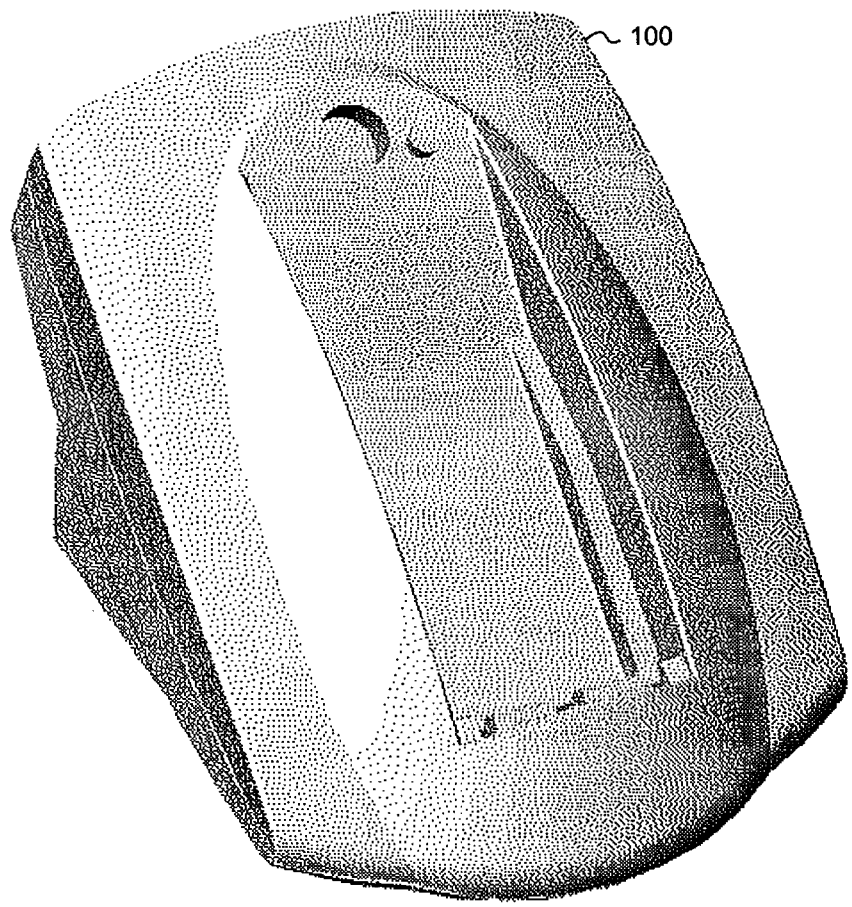
FIG. 9 shows another illustration of the embodiment illustrated in FIGS. 7 and 8.

FIG. 7 illustrates an embodiment of the present invention. System 100 can include a WCDI that can be a modular adapter to couple a WCD to a base portion of system 100. FIG. 8 shows another illustration of the embodiment illustrated in FIG. 7. FIG. 9 shows another illustration of the embodiment illustrated in FIGS. 7 and 8.

Figure 10:
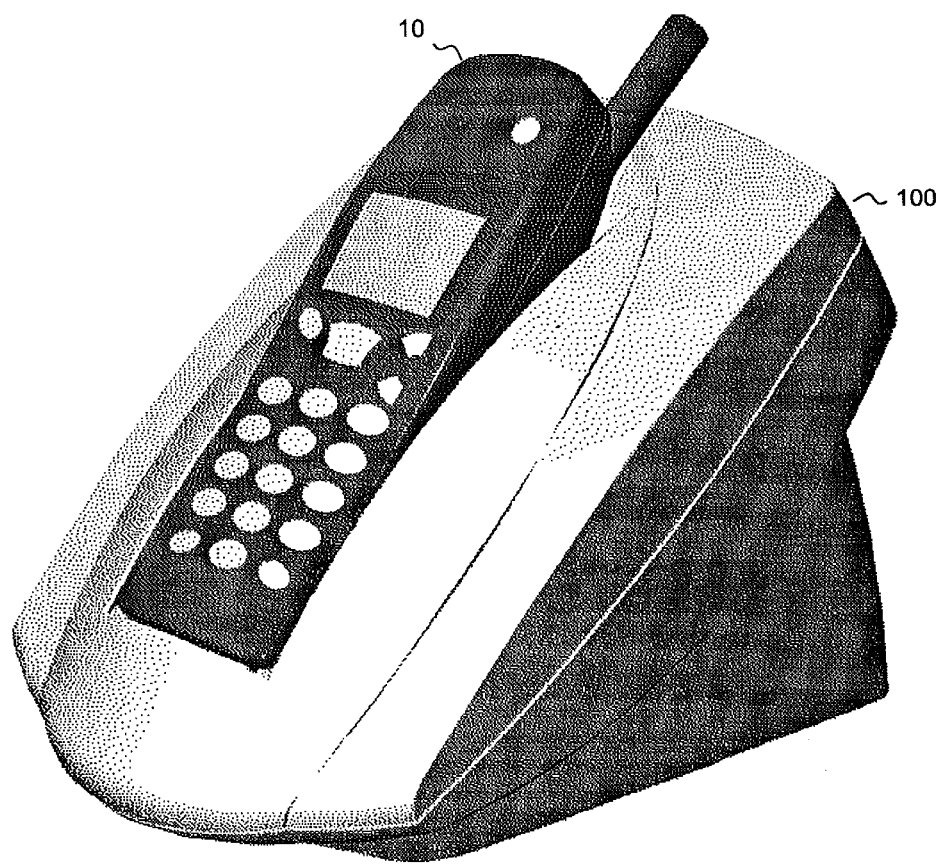
FIG. 10 illustrates a system in accordance with an embodiment of the present invention.
Figure 11:
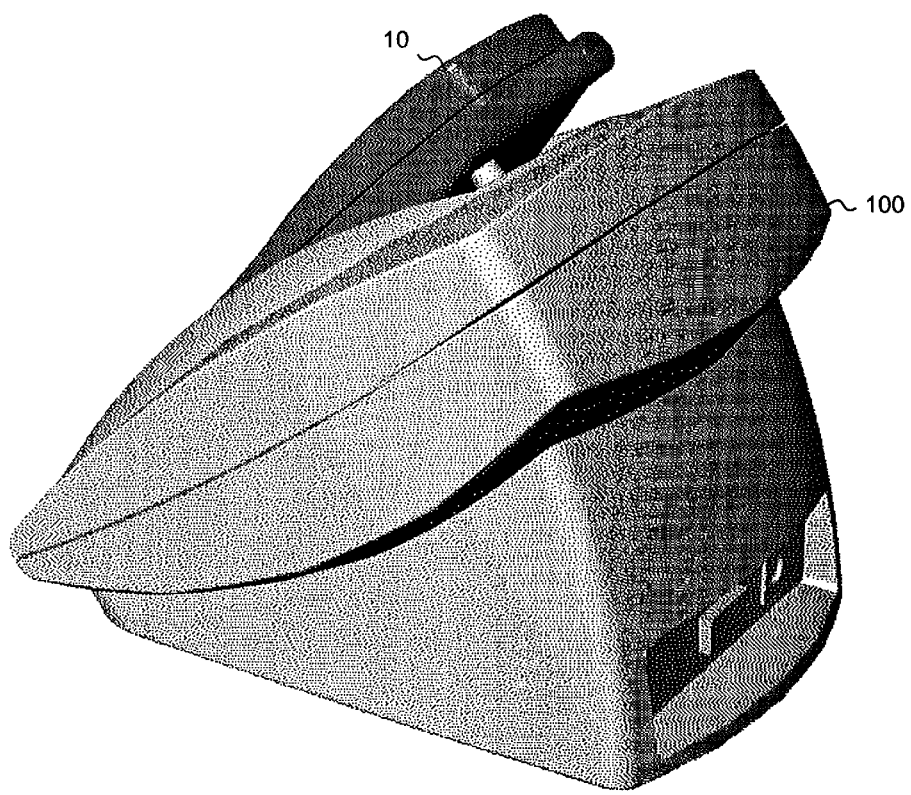
FIG. 11 shows another illustration of the system illustrated in FIG. 10.
Figure 12:
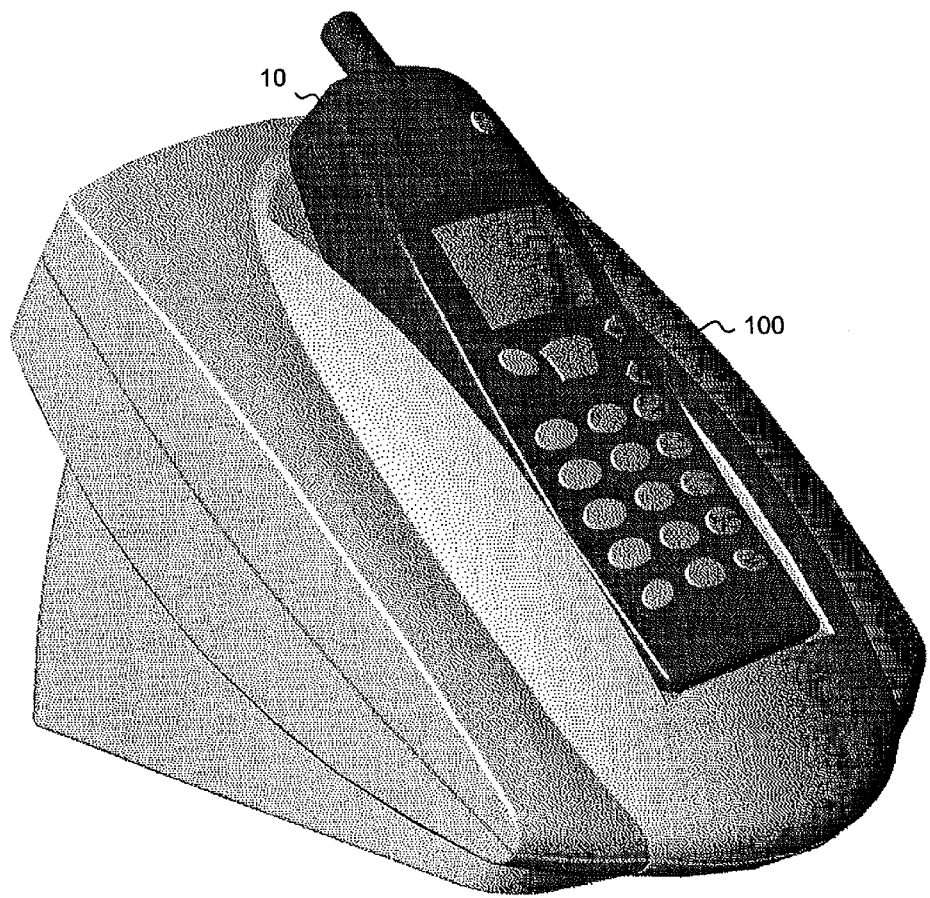
FIG. 12 shows another illustration of the system illustrated in FIGS. 10 and 11.

FIG. 10 illustrates a system in accordance with an embodiment of the present invention. System 100 can include a WCDI that can be a modular adapter to couple WCD 10 to the base portion of system 100. FIG. 11 shows another illustration of the system illustrated in FIG. 10. FIG. 12 shows another illustration of the system illustrated in FIGS. 10 and 11.

Embodiments of the present invention relate to data communications via one or more networks. The data communications can be carried by one or more communications channels of the one or more networks. A network can include wired communication links (e.g., coaxial cable, copper wires, optical fibers, a combination thereof, and so on), wireless communication links (e.g., satellite communication links, terrestrial wireless communication links, satellite-to-terrestrial communication links, a combination thereof, and so on), or a combination thereof. A communications link can include one or more communications channels, where a communications channel carries communications. For example, a communications link can include multiplexed communications channels, such as time division multiplexing ("TDM") channels, frequency division multiplexing ("FDM") channels, code division multiplexing ("CDM") channels, wave division multiplexing ("WDM") channels, a combination thereof, and so on.

In accordance with an embodiment of the present invention, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed. The terms "instructions configured to be executed" and "instructions to be executed" are meant to encompass any instructions that are ready to be executed in their present form (e.g., machine code) by a processor, or require further manipulation (e.g., compilation, decryption, or provided with an access code, etc.) to be ready to be executed by a processor.

Embodiments of systems and methods for wireline-to-wireless communications have been described. In the foregoing description, for purposes of explanation, numerous specific details are set forth to provide a thorough understanding of the present invention. It will be appreciated, however, by one skilled in the art that the present invention may be practiced without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the present invention.

In the foregoing detailed description, systems and methods in accordance with embodiments of the present invention have been described with reference to specific exemplary embodiments. Accordingly, the present specification and figures are to be regarded as illustrative rather than restrictive. The scope of the invention is to be defined by the claims appended hereto, and by their equivalents.

What is claimed is:

1. A system for wireline-to-wireless communications, the system comprising:
    a base unit including
        a wireline interface, and
        a first interface coupled to the wireline interface, the first interface to receive wireline protocol communication signals and send generic protocol communications signals; and
    a wireless communications device adapter coupled to the base unit, the wireless communications device adapter including a second interface, the first interface coupled to the second interface, the second interface to receive generic protocol communications signals and send wireless device protocol communication signals,
    wherein when an about-to-be-placed call, initiated by a wireline telephone connected to the wireline interface, is to be serviced by a wireline service, a conventional dial tone is provided to the wireline telephone to alert a user that the about-to-be-placed call will be serviced by the wireline service, and when the about-to-be-placed call is to be serviced by a wireless service, a tone other than a conventional dial tone is provided to the wireline telephone to alert a user that the about-to-be-placed call will be serviced by a wireless service.

2. The system of claim 1, wherein the wireline interface is a subscriber loop interface.

3. The system of claim 1, wherein the wireline interface is a private branch exchange interface.

4. A method for wireline-to-wireless communications, the method comprising:
    receiving communications signals from a wireline communications device;
    providing a conventional dial tone to a wireline communication device connected to a wireline interface when an about-to-be-placed call is to be serviced by a wireline service to alert a user that the about-to-be-placed call will be serviced by the wireline service, and providing a tone other than a conventional dial tone to the wireline communication device when the about-to-be-placed call is to be serviced by a wireless service to alert the user that the about-to-be-placed call will be serviced by a wireless service;
    adapting the communications signals from a wireline protocol to a generic protocol;
    sending the adapted communications signals across a first interface;
    receiving the adapted communications signals;
    modifying the adapted communications signal from the generic protocol to a wireless communications device protocol; and sending the modified adapted communications signals to a wireless communications device.

5. The method of claim 4, wherein receiving communications signals from the wireline communications device includes receiving communications signals via a subscriber loop interface.

6. The method of claim 4, wherein receiving communications signals from the wireline communications device includes receiving communications signals via a private branch exchange interface.

7. A system for wireline-to-wireless communications, the system comprising:

means for receiving communications signals from a wireline communications device;

means for providing a conventional dial tone to a wireline communication device connected to a wireline interface when an about-to-be-placed call is to be serviced by a wireless service to alert a user that the about-to-be-placed call will be serviced by the wireline service, and means for providing a tone other than a conventional dial tone to the wireline communication device when the about-to-be-placed call is to be serviced by a wireless service to alert the user that the about-to-be-placed call will be serviced by a wireless service;

means for adapting the communications signals from a wireline protocol to a generic protocol;

means for sending the adapted communications signals across a first interface;

means for receiving the adapted communications signals;

means for modifying the adapted communications signals from the generic protocol to a wireless communications device protocol; and means for sending the modified adapted communications signals to a wireless communications device.

8. The system of claim 7, wherein the means for receiving communications signals from the wireline communications device includes a subscriber loop interface.

9. The system of claim 7, wherein the means for receiving communications signals from the wireline communications device includes a private branch exchange interface.

* * * * *